United States Patent
Kosuda et al.

(10) Patent No.: US 7,883,821 B2
(45) Date of Patent: Feb. 8, 2011

(54) PROCESS FOR PRODUCING TITANIUM-CONTAINING METAL OXIDE, HOLOGRAM RECORDING MATERIAL, PROCESS FOR PRODUCING THE SAME, AND HOLOGRAM RECORDING MEDIUM

(75) Inventors: Atsuko Kosuda, Tokyo (JP); Naoki Hayashida, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 524 days.

(21) Appl. No.: 11/953,325

(22) Filed: Dec. 10, 2007

(65) Prior Publication Data
US 2008/0145307 A1 Jun. 19, 2008

(30) Foreign Application Priority Data

Dec. 15, 2006 (JP) .............................. 2006-339264
Aug. 30, 2007 (JP) .............................. 2007-223521

(51) Int. Cl.
*G03H 1/02* (2006.01)
*C03B 8/02* (2006.01)

(52) U.S. Cl. ........................ 430/1; 430/2; 430/280.1; 430/281.1; 359/3; 65/17.2

(58) Field of Classification Search ........................ None
See application file for complete search history.

(56) References Cited

U.S. PATENT DOCUMENTS

| 4,159,209 | A | * | 6/1979 | Womersley ............ 106/287.17 |
| 5,091,009 | A | * | 2/1992 | Nogami et al. ............ 106/287.1 |
| 6,045,903 | A | * | 4/2000 | Seino et al. .................. 428/331 |
| 2003/0067509 | A1 | * | 4/2003 | Sakamaki et al. ............. 347/68 |
| 2004/0197254 | A1 | * | 10/2004 | Toki et al. .................... 423/267 |
| 2006/0172203 | A1 | | 8/2006 | Mizushima | |

(Continued)

FOREIGN PATENT DOCUMENTS

JP     04-342422     * 11/1992

(Continued)

OTHER PUBLICATIONS

Jiang et al. "Ethyene glycol mediated synthesis of metal oxide nanowires" J. Mater. Chem., vol. 14 pp. 695-703 (Jan. 2004).*

(Continued)

*Primary Examiner*—Martin J Angebranndt
(74) *Attorney, Agent, or Firm*—Oblon, Spivak, McClelland, Maier & Neustadt, L.L.P.

(57) ABSTRACT

The present invention provides a process for producing a titanium-containing metal oxide the coloration of which is decreased; a hologram recording material suitable for holographic memory recording using a blue laser, wherein a titanium-containing metal oxide the coloration of which is decreased is used as a metal oxide matrix; a process for producing the same; and a hologram recording medium. A process for producing a metal oxide comprising at least Ti as a metal element, the process comprising: providing an alkoxide compound of Ti to which a glycol other than any geminal diol and any vicinal diol is coordinated; hydrolyzing the alkoxide compound of Ti to which the glycol is coordinated, thereby yielding a precursor of a metal oxide; and advancing polycondensation reaction of the metal oxide precursor, thereby forming the metal oxide.

11 Claims, 2 Drawing Sheets

U.S. PATENT DOCUMENTS

| | | |
|---|---|---|
| 2007/0111107 A1 | 5/2007 | Yoshinari et al. |
| 2007/0111108 A1 | 5/2007 | Hayashida et al. |
| 2007/0243473 A1 | 10/2007 | Mizushima et al. |
| 2007/0243474 A1 | 10/2007 | Mizushima et al. |
| 2008/0057404 A1 | 3/2008 | Kosuda et al. |
| 2008/0057405 A1 | 3/2008 | Yoshinari et al. |
| 2008/0057406 A1 | 3/2008 | Hayashida et al. |
| 2008/0076033 A1 | 3/2008 | Hayashida et al. |
| 2008/0254375 A1 | 6/2008 | Hayashida et al. |
| 2008/0160421 A1 | 7/2008 | Hayashida et al. |
| 2008/0193857 A1 | 8/2008 | Kosuda et al. |
| 2008/0268349 A1 | 10/2008 | Kosuda et al. |
| 2009/0061230 A1* | 3/2009 | Berkei et al. .......... 428/402.24 |
| 2009/0091810 A1 | 4/2009 | Yoshinari et al. |
| 2009/0092904 A1 | 4/2009 | Hayashida et al. |
| 2009/0097085 A1 | 4/2009 | Hayashida et al. |
| 2009/0186281 A1 | 7/2009 | Kosuda et al. |
| 2010/0086859 A1 | 4/2010 | Hayashida et al. |

FOREIGN PATENT DOCUMENTS

| | | | |
|---|---|---|---|
| JP | 09-248467 | * | 9/1997 |
| JP | 2003-176426 | * | 6/2003 |
| JP | 2005-321674 | | 11/2005 |
| WO | 2005/109115 | * | 11/2005 |

OTHER PUBLICATIONS

Negishi et al. "Preparation of transparent thin film photocatalyst and its photocatalytic activity", Chem. Lett., vol. 841-842 (1995).*

Zhang et al. "Nanotubes in Si-doped titanium dioxide", Chem. Commun. pp. 606-607 (Feb. 2002).*

Katjitvichyanukul et al., Effects of diethylene glycol on TiO2 thin film . . . , Sci. Technol. Adv. Mater., vol. 6 pp. 344-347 (Jul. 2005).*

Zhang et al. "Stabilized dispersions of titania nanoparticles via sol-gel process . . . ", Polym. Int. vol. 44(4) pp. 466-472 (Mar. 2006).*

Iwamoto et al. "Synthesis of large surface area silica modified titania ultrafine particels . . . " J. Mat Sci Lett., vol. 19 pp. 1439-1443 (2000).*

Kotani et al., Formation of Anatase nanocrystals in sol-gel derived TiO2-SiO2 thin films . . . J Sol. Gel Sci Technol. vol. 19 pp. 585-588 (2000).*

Nishide et al."Structure of TiO2 in . . . " J. SolGel Sci & Technol. vol. 1 pp. 113-121 (1994).*

Arscott et al.", Sol-gel derived PB(Zr,Ti)O3 . . . " Semicond. Sci. Technol. vol. 13 pp. 244-248 (1998).*

Sirera et al. "Multicomponenet solutions for the deposition of modified lead titanate films", Mat. Reas. Bull., vol. 30(1) pp. 11-18 (1995).*

* cited by examiner

PROCESS FOR PRODUCING TITANIUM-CONTAINING METAL OXIDE, HOLOGRAM RECORDING MATERIAL, PROCESS FOR PRODUCING THE SAME, AND HOLOGRAM RECORDING MEDIUM

BACKGROUND OF THE INVENTION

1. Field of the Invention

The present invention relates to a process for producing a titanium-containing metal oxide the coloration of which is decreased. The present invention also relates to a hologram recording material suitable for volume hologram recording wherein a titanium-containing metal oxide the coloration of which is decreased is used as a metal oxide matrix, a process for producing the same, and a hologram recording medium having a hologram recording layer comprising the hologram recording material. The present invention relates particularly to a hologram recording material suitable for record and reproduction by use of not only a green laser light but also a blue laser light, a process for producing the same, and a hologram recording medium having a hologram recording layer comprising the hologram recording material.

2. Disclosure of the Related Art

The use of films derived from the sol-gel process has been spreading in order to modify the property of a polymer material surface or form an organic-inorganic hybrid film. When a metal oxide is formed by the sol-gel process, a hydrolyzable-group-containing compound of the corresponding metal, for example, an alkoxide compound of the metal is used as a starting material to conduct hydrolysis and polycondensation reaction in an appropriate solvent in the presence of an acid catalyst, thereby yielding a liquid sol, and then the polycondensation reaction is further advanced to turn the sol into a wet gel of the metal oxide. Thereafter, the gel is turned into a dry gel if desired. In the sol-gel process, a sol can be molded, or a sol is applied onto a substrate, thereby making it possible to form a gel film. Alternatively, a gel fiber can be formed by spinning, and various molded products can be produced by molding. In such a way, the sol-gel process advances at low temperature; thus, the process is an excellent process.

When an alkoxide compound of titanium is used as a starting material in the sol-gel process, an oxide of titanium, $TiO_2$, can be obtained. $TiO_2$ has a high refractive index so as to be optically advantageous. Moreover, $TiO_2$ is used for surface modification since $TiO_2$ has a photocatalytic effect.

However, $TiO_2$ obtained by the sol-gel process undergoes coloration easily. Even if an alkoxide compound of titanium as a starting material is colorless, the compound is frequently colored into yellow at the stage when the compound reacts. $TiO_2$ colored into yellow absorbs light in the blue region so as to cause a problem when the $TiO_2$ is used in an optical waveguide or is used in a hologram recording material for a system wherein a blue laser is used to attain recording/reproducing. Moreover, a problem is caused when the $TiO_2$ is used in any other article wherein the absorption of light in the blue region is not preferred. From this viewpoint, it has been desired to develop a producing process of a titanium-containing metal oxide the coloration of which is decreased.

Examples of the property required for a volume hologram recording material include high refractive index change at the time of recording, high sensitivity, low scattering, environment resistance, durability, low dimensional change, and high multiplicity. About holographic memory record using a green laser, various reports have been made hitherto as follows.

For example, JP-A-2005-321674 discloses a hologram recording material comprising: an organometallic compound at least containing at least two kinds of metals (Si and Ti), oxygen, and an aromatic group, and having an organometallic unit wherein two aromatic groups are directly bonded to one metal (Si); and a photopolymerizable compound. In Example 1 of the publication (in particular, pars. [0074] to [0078]), it is disclosed that a hologram recording medium which has a layer of the above-mentioned hologram recording material having a thickness of 100 μm gave a high transmittance, a high refractive index change, a low scattering, and a high multiplicity in record using a Nd:YAG laser (532 nm).

The above-mentioned publication discloses holographic memory record using a green laser, but does not disclose holographic memory record using a blue laser.

SUMMARY OF THE INVENTION

An object of the present invention is to provide a process for producing a titanium-containing metal oxide the coloration of which is decreased. Another object of the present invention is to provide a hologram recording material suitable for volume hologram recording wherein a titanium-containing metal oxide the coloration of which is decreased is used as a metal oxide matrix to attain a high refractive index change, a high flexibility, a high sensitivity, a low scattering property, a high environment resistance, a high durability, a low dimension change (a low shrinkage), and a high multiplicity in holographic memory recording using a blue laser as well as a green laser; and a process for producing the same. An additional object of the present invention is to provide a hologram recording medium having a hologram recording layer comprising the above-mentioned hologram recording material.

The present inventors have made investigations, so as to find out that when a blue laser is used to make a holographic memory record in the hologram recording medium disclosed in JP-A-2005-321674, the light transmittance thereof falls so that good holographic memory recording characteristics cannot be obtained. It has also been understood that the fall in the light transmittance results from coloration of a metal oxide matrix containing Ti as a constituent metal element when the matrix is formed by the sol-gel process. When a light transmittance falls, holograms (interference fringes) are unevenly formed in the recording layer along the thickness direction of the recording layer so that scattering-based noises and the like are generated. It has been found out that in order to obtain good hologram image characteristics, it is necessary that the medium has a light transmittance of 50% or more.

A light transmittance of a hologram recording layer depends on a thickness thereof. As the thickness of the recording layer is made smaller, the light transmittance is improved; however, the widths of diffraction peaks obtained when reproducing light is irradiated into a recorded pattern become larger so that separability between adjacent diffraction peaks deteriorates. Accordingly, in order to obtain a sufficient SN ratio (Signal to Noise ratio), it is indispensable to make a shift interval (an angle or the like) large when multiple record is made. For this reason, a high multiplicity cannot be attained. In the use of a hologram recording medium in any recording system, the thickness of its recording layer is required to be at lowest 100 μm in order to attain holographic memory recording characteristics for ensuring a high multiplicity.

The present invention includes the followings:

(1) A process for producing a metal oxide comprising at least Ti as a metal element, the process comprising:

providing an alkoxide compound of Ti to which a glycol other than any geminal diol and any vicinal diol is coordinated;

hydrolyzing the alkoxide compound of Ti to which the glycol is coordinated, thereby yielding a precursor of a metal oxide; and advancing polycondensation reaction of the metal oxide precursor, thereby forming the metal oxide.

(2) A process for producing a metal oxide comprising at least Ti and Si as metal elements, the process comprising:

providing an alkoxide compound of Ti to which a glycol other than any geminal diol and any vicinal diol is coordinated;

mixing the alkoxide compound of Ti to which the glycol is coordinated with an alkoxide compound of Si;

hydrolyzing the mixed alkoxide compounds, thereby yielding a precursor of a metal oxide; and advancing polycondensation reaction of the metal oxide precursor, thereby forming the metal oxide.

(3) The process for producing a metal oxide according to the above-described (1) or (2), wherein in the providing step of the alkoxide compound of Ti, the alkoxide compound of Ti is mixed with the glycol other than any geminal diol and any vicinal diol, thereby coordinating the glycol to the alkoxide compound of Ti.

(4) The process for producing a metal oxide according to any one of the above-described (1) to (3), wherein the glycol is represented by the following general formula (I):

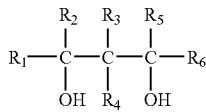

(I)

wherein $R_1$, $R_2$, $R_3$, $R_4$, $R_5$ and $R_6$, which may be the same or different, each represent a hydrogen atom or an alkyl group provided that the total number of carbon atoms contained in $R_1$, $R_2$, $R_3$, $R_4$, $R_5$ and $R_6$ is from 0 to 5.

(5) The process for producing a metal oxide according to any one of the above-described (1) to (3), wherein the glycol is represented by the following general formula (II):

wherein $R_{11}$ represents an alkylene group, p represents the number of repeating units of alkylene oxide, and $p \geqq 2$.

(6) A hologram recording material comprising a metal oxide matrix and a photopolymerizable compound, wherein the metal oxide matrix comprises at least Ti and Si as metal elements, and a glycol is coordinated to Ti.

(7) A process for producing a hologram recording material comprising a metal oxide comprising at least Ti and Si as metal elements, and a photopolymerizable compound, the process comprising:

providing an alkoxide compound of Ti to which a glycol other than any geminal diol and any vicinal diol is coordinated;

mixing the alkoxide compound of Ti to which the glycol is coordinated with an alkoxide compound of Si;

hydrolyzing the mixed alkoxide compounds, thereby yielding a precursor of a metal oxide;

incorporating a photopolymerizable compound into the resultant system before, during, or after the hydrolysis; and advancing polycondensation reaction of the metal oxide precursor into which the photopolymerizable compound is incorporated.

(8) The process for producing a hologram recording material according to the above-described (7), wherein in the providing step of the alkoxide compound of Ti, the alkoxide compound of Ti is mixed with the glycol other than any geminal diol and any vicinal diol, thereby coordinating the glycol to the alkoxide compound of Ti.

(9) The process for producing a hologram recording material according to the above-described (7) or (8), wherein the glycol is represented by the following general formula (I):

(I)

wherein $R_1$, $R_2$, $R_3$, $R_4$, $R_5$ and $R_6$, which may be the same or different, each represent a hydrogen atom or an alkyl group provided that the total number of carbon atoms contained in $R_1$, $R_2$, $R_3$, $R_4$, $R_5$ and $R_6$ is from 0 to 5.

(10) The process for producing a hologram recording material according to the above-described (7) or (8), wherein the glycol is represented by the following general formula (II):

wherein $R_{11}$ represents an alkylene group, p represents the number of repeating units of alkylene oxide, and $p \geqq 2$.

(11) A hologram recording medium having a hologram recording layer comprising the hologram recording material according to the above-described (6), or the hologram recording material obtained by the producing process according to any one of the above-described (7) to (10).

(12) The hologram recording medium according to the above-described (11), wherein record/reproduction of said hologram recording medium are performed by use of a laser light having a wavelength of 350 to 450 nm.

(13) The hologram recording medium according to the above-described (11) or (12), wherein the hologram recording layer has a thickness of at least 100 μm.

(14) A metal oxide material comprising at least Ti and Si as metal elements, wherein a glycol is coordinated to Ti.

(15) A metal oxide material, comprising at least Ti as a metal element wherein a glycol is coordinated to Ti.

In the producing process of a metal oxide in the present invention, a glycol other than any geminal diol and any vicinal diol is coordinated to an alkoxide compound of Ti, and subsequently the alkoxide compound of Ti is subjected to hydrolysis and polycondensation reaction. Alternatively, an alkoxide compound of Ti to which a glycol other than any geminal diol and any vicinal diol is coordinated is used as a starting material, and the Ti alkoxide compound is subjected to hydrolysis and polycondensation reaction. In the state that the glycol is coordinated to Ti, the hydrolysis and the polycondensation reaction are conducted, thereby significantly decreasing the coloration of the resultant titanium-containing metal oxide. Accordingly, the metal oxide obtained by the producing process of the present invention is suitable for various articles about which the absorption of light in the blue region is not preferred, for example, an optical waveguide which is required to have low optical loss property, various coating films which are required to have transparency, and a metal oxide matrix material in a hologram recording material.

About the hologram recording material obtained by the producing process of the present invention, the coloration thereof is significantly decreased, and the absorption of light having a wavelength in the blue region is slight. For this reason, by use of the hologram recording material of the present invention, provided is a hologram recording medium suitable for recording/reproducing using not only a green laser light but also a blue laser light.

DETAILED DESCRIPTION OF THE INVENTION

Figure 1:
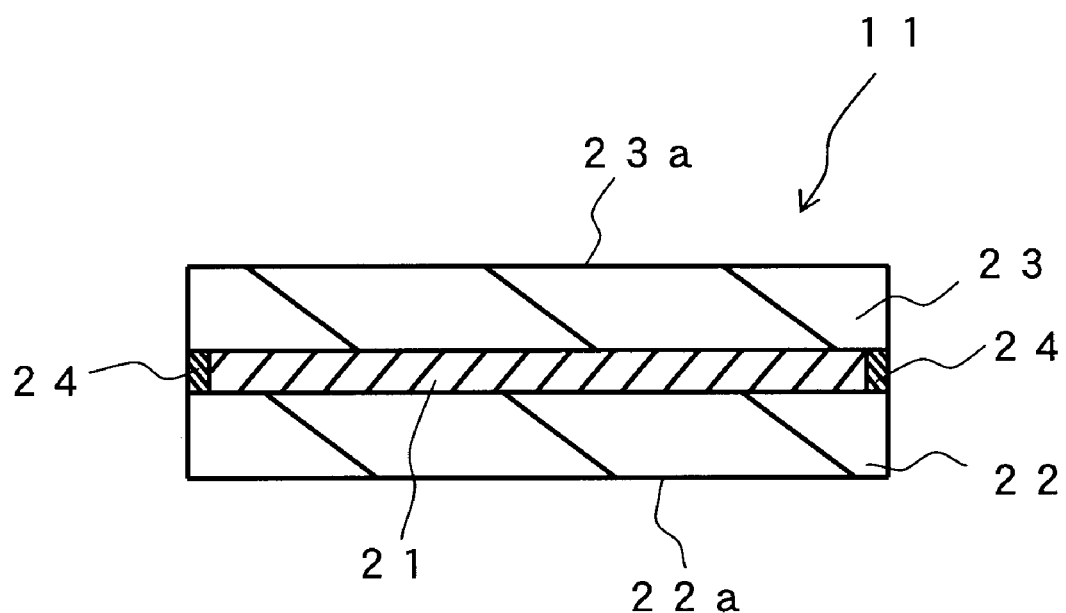
FIG. 1 is a view illustrating a schematic cross section of a hologram recording medium produced in an example.

The process of the present invention of producing a titanium-containing metal oxide is first described.

In the process of the present invention, provided is first an alkoxide compound of Ti to which a glycol other than any geminal diol and any vicinal diol is coordinated. It is advisable that this providing step is carried out by mixing an alkoxide compound of Ti with a glycol other than any geminal diol and any vicinal diol, thereby coordinating the glycol to the Ti alkoxide compound. Alternatively, it is allowable to obtain commercially an alkoxide compound of Ti to which a glycol other than any geminal diol and any vicinal diol is coordinated, and use the compound as a starting material.

Next, the Ti alkoxide compound to which the glycol is coordinated is hydrolyzed (and polycondensed) to yield a metal oxide precursor. Thereafter, the polycondensation reaction of the metal oxide precursor is further advanced to form a metal oxide. In order to form a film of the metal oxide, it is advisable to form the metal oxide precursor, which is in a sol state, into a film form, and advance the polycondensation reaction of the precursor.

In the case of producing a metal oxide containing Si (and/or a different metal(s) as the need arises) besides Ti as metal elements, likewise, an alkoxide compound of Ti to which a glycol other than any geminal diol and any vicinal diol is coordinated is first provided. It is advisable that this providing step is carried out by mixing an alkoxide compound of Ti with a glycol other than any geminal diol and any vicinal diol in the same way as described above, thereby coordinating the glycol to the Ti alkoxide compound. Alternatively, it is allowable to obtain commercially an alkoxide compound of Ti to which a glycol other than any geminal diol and any vicinal diol is coordinated, and use the compound as a starting material.

It is advisable to appropriately select the alkoxide compound of Ti, an alkoxide compound of Si, and an alkoxide compound of the different metal(s) other than Ti and Si, from such known compounds in accordance with the purpose of the titanium-containing metal oxide.

Next, the Ti alkoxide compound to which the glycol is coordinated is mixed with the alkoxide compound of Si (and/or the alkoxide compound of the different metal(s) as the need arises), thereby obtaining mixed alkoxide compounds. Next, the mixed alkoxide compounds, which contains the Ti alkoxide compound to which the glycol is coordinated and the Si alkoxide compound (and/or the different metal alkoxide compound(s) as the need arises), are hydrolyzed (and polycondensed) to yield a metal oxide precursor. Thereafter, the polycondensation reaction of the metal oxide precursor is further advanced to form a metal oxide. In order to form a film of the metal oxide, it is advisable to form the metal oxide precursor, which is in a sol state, into a film form, and advance the polycondensation reaction of the precursor.

In any one of the above-mentioned cases, the hydrolysis and the polycondensation reaction of the Ti alkoxide compound are conducted in the state that the glycol other than any geminal diol and any vicinal diol is coordinated to the Ti alkoxide compound. When the Ti alkoxide compound to which the glycol is coordinated is hydrolyzed, the coordination of the glycol to the Ti atom does not cause the coordination of any different coordinating compound (for example, a reaction solvent having coordinating ability, such as tetrahydrofuran (THF)) to the Ti atom in the sol-gel reaction.

From the present inventors' investigations, it appears that the coloration of a titanium-containing metal oxide caused in the sol-gel reaction thereof is caused by the coordination of a coordinating compound to the Ti atom, in particular, the coordination thereof through π electrons to the Ti atom. Accordingly, when the Ti alkoxide compound to which the glycol is coordinated is hydrolyzed, any different coordinating compound is restrained from being coordinated to the Ti atom. Additionally, coloration based on the coordination of the glycol is not generated since the glycol is coordinated through hydrogen bonds to the Ti atom. Consequently, the coloration of the metal oxide caused in the sol-gel reaction can be decreased.

In the present invention, the glycol is preferably selected from the compounds represented by the following general formula (I):

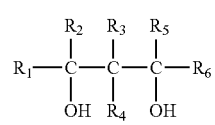

(I)

In the general formula (I), $R_1$, $R_2$, $R_3$, $R_4$, $R_5$ and $R_6$, which may be the same or different, each represent a hydrogen atom or an alkyl group provided that the total number of carbon atoms contained in $R_1$, $R_2$, $R_3$, $R_4$, $R_5$ and $R_6$ is from 0 to 5, preferably from 2 to 5.

The alkyl group represented by each of $R_1$, $R_2$, $R_3$, $R_4$, $R_5$ and $R_6$ is a linear or branched lower alkyl group having 1 to 5 carbon atom(s) in order that the above-mentioned requirement about the total number of the carbon atoms can be satisfied.

Examples thereof include methyl, ethyl, propyl, butyl and pentyl groups.

Examples of the glycol represented by the general formula (I) include 1,3-propanediol, 1,3-butanediol, 2-methyl-1,3-propanediol, 2-ethyl-1,3-hexanediol, and 2-methyl-2,4-pentanediol.

The above-mentioned glycol (that is, the 1,3-diol) is easily coordinated to the Ti atom of the Ti alkoxide compound as a starting material to fill the coordination positions of the Ti atom, and hinders any different coordinating compound from being coordinated to the Ti atom in the sol-gel reaction. The coordination of the glycol to the Ti alkoxide compound is preferably attained by mixing the Ti alkoxide compound such as tetrabutoxytitanium or tetraethoxytitanium with the glycol in a solvent such as ethanol or butanol, for example, at room temperature, and then stirring the mixture. The solvent used in this case may be the same solvent used in the sol-gel reaction. In such a way, the Ti alkoxide compound to which the glycol is coordinated is prepared. The reason why any geminal diol and any vicinal diol are excluded from the glycol used in the present invention is that these diols cannot be coordinated to Ti or are slightly coordinated thereto.

In the present invention, it is also preferred that the glycol is selected from the polyalkylene glycols represented by the following general formula (II) besides the 1,3-diols represented by the general formula (I):

 (II)

In the general formula (II), $R_{11}$ represents an alkylene group. The alkylene group represented by $R_{11}$ is a linear lower alkylene group having 1 to about 6 carbon atom(s). Examples thereof include ethylene, propylene and butylene groups. The symbol p represents the number of repeating units of alkylene oxide, and $p \geq 2$. The upper limit of p is not particularly limited, and is usually about 4.

Examples of the polyalkylene glycol include diethylene glycol, triethylene glycol, tetraethylene glycol, dipropylene glycol, tripropylene glycol, and tetrapropylene glycol.

In the same manner as in the 1,3-diol, the above-mentioned polyalkylene glycol is easily coordinated to the Ti atom of the Ti alkoxide compound as a starting material to fill the coordination positions of the Ti atom, and hinders any different coordinating compound from being coordinated to the Ti atom in the sol-gel reaction. The coordination of the polyalkylene glycol to the Ti alkoxide compound is preferably attained in the same way as the coordination of the 1,3-diol thereto. Out of the above-mentioned polyalkylene glycols, dipropylene glycol is preferred since the glycol is high in coordinating ability and is easily available.

Next, the Ti alkoxide compound to which the glycol is coordinated is hydrolyzed and/or polycondensed to yield a metal oxide precursor. In the case of producing a metal oxide containing Si (and/or a different metal(s) as the need arises) besides Ti as metal elements, the Ti alkoxide compound to which the glycol is coordinated is mixed with an alkoxide compound of Si (and/or an alkoxide compound of the different metal(s) as the need arises), and subsequently the mixed alkoxide compounds containing the Ti alkoxide compound to which the glycol is coordinated and the Si alkoxide compound (and/or the different metal alkoxide compound(s) as the need arises) is hydrolyzed and/or polycondensed to yield a metal oxide precursor.

The hydrolysis and polycondensation reaction can be carried out by the same operation under the same conditions as in known sol-gel methods. For example, the metal alkoxide compounds (the Ti alkoxide compound to which the glycol is coordinated and the optional Si alkoxide compound, and the optional different metal alkoxide compound(s) as the need arises) as the starting materials in a predetermined ratio are dissolved into an appropriate good solvent to prepare a homogeneous solution. An appropriate acid catalyst is dropwise added to the solution, and the solution is stirred in the presence of water, whereby the reaction can be conducted. The amount of the solvent is not limited, and is preferably 10 to 1,000 parts by weight with respect to 100 parts by weight of the whole of the metal alkoxide compound.

Examples of such a solvent include: water; alcohols such as methanol, ethanol, propanol, isopropanol, and butanol; ethers such as diethyl ether, dioxane, dimethoxyethane and tetrahydrofuran; and N-methylpyrrolidone, acetonitrile, N,N-dimethylformamide, N,N-dimethylacetamide, dimethylsulfoxide, acetone, benzene, and the like. The solvent may be appropriately selected from these. Alternatively, a mixture of these may be used.

However, in the step of coordinating the glycol to the Ti alkoxide compound, the following should not be used: dioxane, tetrahydrofuran, N-methylpyrrolidone, N,N-dimethylformamide, N,N-dimethylacetamide, acetylacetone or the like. The present inventors' investigations have demonstrated the following: the ether oxygen in a cyclic ether skeleton or a carbonyl oxygen has high coordinating ability to Ti, and thus these organic solvents are each easily coordinated to Ti of the Ti alkoxide compound wherein coordination positions are not filled (or are each easily combined with Ti thereof to form a complex); for this reason, the resultant metal oxide comes to absorb blue light.

Accordingly, an organic solvent suitable not only for the step of the glycol but also for the sol-gel step is a monoalcohol, and a monoalkyl ether of a dialcohol. Specific examples thereof include monoalcohols such as methanol, ethanol, propanol, isopropanol, or butanol; and monoalkyl ethers of a dialcohol such as 1-methoxy-2-propanol, or ethylene glycol monomethyl ether (methylcellosolve). From these solvents, an appropriate solvent may be selected. Alternatively, two or more may be selected therefrom, and a mixed solvent thereof may be used. These solvents are low in coordinating ability to Ti, or even if the solvents are each coordinated thereto, a transition absorption band having a low energy is not generated. Accordingly, even if these solvents remain in the metal oxide, the absorption of blue light into the resultant metal oxide is decreased.

Examples of the acid catalyst include: inorganic acids such as hydrochloric acid, sulfuric acid, nitric acid and phosphoric acid; organic acids such as formic acid, acetic acid, trichloroacetic acid, trifluoroacetic acid, propionic acid, methanesulfonic acid, ethanesulfonic acid, and p-toluenesulfonic acid; and the like.

The hydrolysis polymerization reaction can be generally conducted at room temperature, which depends on the reactivity of the metal alkoxide compounds. The reaction can be conducted at a temperature of about 0 to 150° C., preferably at a temperature of about room temperature to 50° C. The reaction time may be appropriately determined, correspondingly to the relationship with the reaction temperature. The time is about 0.1 to 240 hours. The reaction may be conducted in an inert atmosphere such as nitrogen gas, or may be conducted under a reduced pressure of about 0.5 to 1 atom while the alcohol produced by the polymerization reaction is removed.

The polycondensation reaction of the resultant metal oxide precursor is further advanced to form a metal oxide. In order to form a film of the metal oxide, it is advisable to apply the metal oxide precursor, which is in a sol state, onto a substrate to form a film, and advance the polycondensation reaction of the precursor further.

When the Ti alkoxide compound to which the glycol is coordinated is subjected to the sol-gel reaction as described above, any different coordinating compound is hindered from being coordinated to the Ti atom in the sol-gel reaction. The coloration of the resultant titanium-containing metal oxide is significantly decreased. Accordingly, the metal oxide obtained by the producing process of the present invention is suitable for various articles about which the absorption of light in the blue region is not preferred, for example, an optical waveguide (a plate type optical waveguide film) which is required to have low optical loss property, various coating films which are required to have transparency, and a metal oxide matrix material in a hologram recording material.

The following will describe the hologram recording material of the present invention to which the above-mentioned metal oxide producing process is applied.

The hologram recording material of the present invention comprises a metal oxide matrix and a photopolymerizable compound. The metal oxide matrix contains, as metal elements, at least Ti and Si. The glycol is coordinated to Ti. The metal oxide is present in the form of fine particles, and may be a metal oxide wherein Ti atoms are bonded to each other through an oxygen atom (Ti—O—Ti), a metal oxide wherein Si atoms are bonded to each other through an oxygen atom (Si—O—Si), or a metal oxide wherein a Ti atom and a Si atom are bonded through an oxygen atom (Ti—O—Si). This metal oxide matrix can be obtained by the above-mentioned metal oxide producing process.

Namely, provided is first an alkoxide compound of Ti to which a glycol other than any geminal diol and any vicinal diol is coordinated. In the same manner as described above, it is advisable that this providing step is carried out by mixing an alkoxide compound of Ti with a glycol other than any geminal diol and any vicinal diol to coordinate the glycol to the Ti alkoxide compound. Alternatively, it is allowable to obtain commercially an alkoxide compound of Ti to which a glycol other than any geminal diol and any vicinal diol is coordinated, and use the compound as a starting material.

The glycol to be used may be appropriately selected from the above-mentioned glycols.

Next, the Ti alkoxide compound to which the glycol is coordinated is mixed with an alkoxide compound of Si (and/or an alkoxide compound of a different metal(s) as the need arises), so as to prepare mixed alkoxide compounds. Next, the mixed alkoxide compounds, which contains the Ti alkoxide compound to which the glycol is coordinated and the Si alkoxide compound (and/or the different metal alkoxide compound(s) as the need arises), are hydrolyzed (and polycondensed) to yield a metal oxide precursor.

The hydrolysis and polycondensation reaction can be carried out by the same operation under the same conditions as in known sol-gel methods. For example, the metal alkoxide compounds (the Ti alkoxide compound to which the glycol is coordinated and the Si alkoxide compound, and the optional different metal alkoxide compound(s) as the need arises) as the starting materials in a predetermined ratio are dissolved into an appropriate good solvent as above-mentioned to prepare a homogeneous solution. An appropriate acid catalyst is dropwise added to the solution, and the solution is stirred in the presence of water, whereby the reaction can be conducted. The amount of the solvent is not limited, and is preferably 10 to 1,000 parts by weight with respect to 100 parts by weight of the whole of the metal alkoxide compound. The acid catalyst to be used and the conditions for the hydrolysis and polymerization reaction are also as above-described.

Before, during or after the hydrolysis, the photopolymerizable organic compound which is described later is mixed. The photopolymerizable organic compound may be mixed with the metal alkoxide compounds as the starting materials after, during or before the hydrolysis. In the case of the mixing after the hydrolysis, it is preferred to add and mix the photopolymerizable organic compound in the state that the sol-gel reaction system containing the metal oxide and/or the metal oxide precursor is sol in order to perform the mixing uniformly. The mixing of a photopolymerization initiator or photosensitizer can also be conducted before, during or after the hydrolysis.

A polycondensation reaction of the metal oxide precursor with which the photopolymerizable compound is mixed is advanced to yield a hologram recording material solution in which the photopolymerizable organic compound are uniformly incorporated in the sol-form metal oxide matrix. The hologram recording material solution is applied onto a substrate, and then the solvent is dried, and the sol-gel reaction is further advanced. As a result, a hologram recording material layer in a film form is yielded. In such a way, the hologram recording material layer is produced wherein the photopolymerizable organic compound is uniformly contained in the metal oxide matrix.

Preferably, the Ti alkoxide compound as a starting material to which the glycol is to be coordinated is appropriately selected from tetrapropoxytitanium, tetrabutoxytitanium, a titanium butoxide oligomer (corresponding to a partially hydrolyzed condensate of tetrabutoxytitanium), and so on.

In the meantime, as the Si alkoxide compound as a starting material, an alkoxy group-containing organosilicon compound is preferably used. The organosilicon compound is a compound which has, in the molecule thereof, at least one direct bond (silicon-carbon bond) between a silicon atom and a carbon atom of an organic group. Accordingly, the alkoxy group-containing organosilicon compound is a compound which has, in the molecule thereof, at least one direct bond (silicon-carbon bond) between a silicon atom and a carbon atom of an organic group, and further contains an alkoxy group. The organic group which constitutes the organosilicon is preferably an aromatic hydrocarbon group, and the Si alkoxide compound as a starting material to be used may be a compound wherein an aromatic hydrocarbon group is bonded directly to a metal (silicon) atom, or a compound wherein an aromatic hydrocarbon group is bonded to a metal (silicon) atom through a non-aromatic hydrocarbon moiety. Examples of the compound wherein an aromatic hydrocarbon group is bonded directly to a metal atom include triphenylethoxysilane, diphenyldimethoxysilane, diphenyldiethoxysilane, phenyltrimethoxysilane, phenyltriethoxysilane, di(p-tolyl)dimethoxysilane, and p-tolyltrimethoxysilane. An example of the compound wherein an aromatic hydrocarbon group is bonded to a metal atom through a non-aromatic hydrocarbon moiety is [(chloromethyl)phenylpropyl]methyldimethoxysilane.

When a Si alkoxide compound as a starting material as descried above is used, an organic group (aromatic hydrocarbon group)-containing metal oxide matrix is formed. This is favorable since the matrix has flexibility and compatibility with a photopolymerizable compound. As described above, about Si in this metal oxide matrix, a direct bond (silicon-carbon bond) between the silicon atom and the carbon atom of the organic group is formed, which originates from the organosilicon compound as the starting material. In short, this metal oxide matrix is constructed to contain an organometallic compound.

Of course, in the present invention, it is allowable to use a hydrolysable group-containing silicon which does not contain any aromatic hydrocarbon group besides the above-mentioned aromatic hydrocarbon group-containing organosilicon as the starting material. Examples thereof include tetramethoxysilane, tetraethoxysilane, tetrapropoxysilane, methyltrimethoxysilane, ethyltrimethoxysilane, propyltrimethoxysilane, methyltriethoxysilane, ethyltriethoxysilane, propyltriethoxysilane, γ-mercaptopropyltrimethoxysilane, γ-mercaptopropyltriethoxysilane, γ-aminopropyltrimethoxysilane, γ-aminopropyltriethoxysilane, dimethyldimethoxysilane, and dimethyldiethoxysilane.

When a monoalkoxysilane such as triphenylethoxysilane or trimethylmethoxysilane is present, the polymerization reaction is stopped. Thus, the monoalkoxysilane can be used to adjust the molecular weight.

The alkoxide compound of a metal other than titanium and silicon is not particularly limited, and examples thereof include pentaethoxytantalum (Ta(OEt)$_5$), tetra-t-butoxyzirconium (Zr(O-tBu)$_4$), tetra-n-butoxyzirconium (Zr(O-nBu)$_4$). And, other metal alkoxide compounds may be used.

The blend amounts of the titanium alkoxide compound and the silicon alkoxide compound are appropriately decided, considering the blend ratio between Ti and Si in the metal oxide matrix so as to give a desired refractive index. For example, it is advisable to set the atomic ratio of Ti/Si into the range of 0.1/1.0 to 10/1.0.

In the present invention, the photopolymerizable compound is a photopolymerizable monomer. As the photopolymerizable compound, a compound selected from a radical polymerizable compound and a cation polymerizable compound can be used.

The radical polymerizable compound is not particularly limited as long as the compound has in the molecule one or more radical polymerizable unsaturated double bonds. For example, a monofunctional and multifunctional compound having a (meth) acryloyl group or a vinyl group can be used. The wording "(meth)acryloyl group" is a wording for expressing a methacryloyl group and an acryloyl group collectively.

Examples of the compound having a (meth)acryloyl group, out of the radical polymerizable compounds, include monofunctional (meth)acrylates such as phenoxyethyl (meth)acrylate, 2-methoxyethyl(meth)acrylate, 2-hydroxyethyl(meth) acrylate, benzyl(meth)acrylate, cyclohexyl(meth)acrylate, ethoxydiethylene glycol (meth)acrylate, methoxypolyethylene glycol(meth)acrylate, methyl(meth)acrylate, polyethylene glycol(meth)acrylate, polypropylene glycol(meth)acrylate, and stearyl (meth)acrylate; and polyfunctional(meth)acrylates such as trimethylolpropane tri(meth)acrylate, pentaerythritol tetra(meth)acrylate, dipentaerythritol hexa(meth)acrylate, diethylene glycol di(meth) acrylate, triethylene glycol di(meth)acrylate, tetraethylene glycol di(meth)acrylate, polyethylene glycol di(meth)acrylate, bis(2-hydroxyethyl)isocyanurate di(meth)acrylate, and 2,2-bis[4-(acryloxy-diethoxy)phenyl]propane. However, the compound having a (meth)acryloyl group is not necessarily limited thereto.

Examples of the compound having a vinyl group include monofunctional vinyl compounds such as monovinylbenzene, and ethylene glycol monovinyl ether; and polyfunctional vinyl compounds such as divinylbenzene, ethylene glycol divinyl ether, diethylene glycol divinyl ether, and triethylene glycol divinyl ether. However, the compound having a vinyl group is not necessarily limited thereto.

One kind of the radical polymerizable compound may be used, and two or more kinds thereof are used together. In the case of making the refractive index of the metal oxide high and making the refractive index of the organic polymer low, in the present invention, a compound having no aromatic group to have low refractive index (for example, refractive index of 1.5 or less) is preferred out of the above-mentioned radical polymerizable compounds. In order to make the compatibility with the metal oxide better, preferred is a more hydrophilic glycol derivative such as polyethylene glycol(meth)acrylate and polyethylene glycol di(meth)acrylate.

The cation polymerizable compound is not particularly limited about the structure as long as the compound has at least one reactive group selected from a cyclic ether group and a vinyl ether group.

Examples of the compound having a cyclic ether group out of such cation polymerizable compounds include compounds having an epoxy group, an alicyclic epoxy group or an oxetanyl group.

Specific examples of the compound having an epoxy group include monofunctional epoxy compounds such as 1,2-epoxyhexadecane, and 2-ethylhexyldiglycol glycidyl ether; and polyfunctional epoxy compounds such as bisphenol A diglycidyl ether, novolak type epoxy resins, trisphenolmethane triglycidyl ether, 1,4-butanediol diglycidyl ether, 1,6-hexanediol diglycidyl ether, glycerin triglycidyl ether, trimethylolpropane triglycidyl ether, propylene glycol diglycidyl ether, and polyethylene glycol diglycidyl ether.

Specific examples of the compound having an alicyclic epoxy group include monofunctional compounds such as 1,2-epoxy-4-vinylcyclohexane, D-2,2,6-trimethyl-2,3-epoxybicyclo[3,1,1]heptane, and 3,4-epoxycyclohexylmethyl (meth)acrylate; and polyfunctional compounds such as 2,4-epoxycyclohexylmethyl-3,4-epoxycyclohexane carboxylate, bis(3,4-epoxycyclohexylmethyl) adipate, 2-(3,4-epoxycyclohexyl-5,5-spiro-3,4-epoxy)cyclohexanone-m-dioxane, bis(2,3-epoxycyclopentyl)ether, and EHPE-3150 (alicyclic epoxy resin, manufactured by Dicel Chemical Industries, Ltd.).

Specific examples of the compound having an oxetanyl group include monofunctional oxetanyl compounds such as 3-ethyl-3-hydroxymethyloxetane, 3-ethyl-3-(2-ethylhexyloxymethyl)oxetane, and 3-ethyl-3-(cyclohexyloxymethyl) oxetane; and polyfunctional oxetanyl compounds such as 1,4-bis[(3-ethyl-3-oxetanylmethoxy)methyl]benzene, 1,3-bis[(3-ethyl-3-oxetanylmethoxy)methyl]propane, ethylene glycol bis(3-ethyl-3-oxetanylmethyl)ether, trimethylolpropanetris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, and ethylene oxide modified bisphenol A bis(3-ethyl-3-oxetanylmethyl)ether.

Specific examples of the compound having a vinyl ether group, out of the above-mentioned cation polymerizable compounds, include monofunctional compounds such as triethylene glycol monovinyl ether, cyclohexanedimethanol monovinyl ether, and 4-hydroxycyclohexyl vinyl ether; and polyfunctional compounds such as triethylene glycol divinyl ether, tetraethylene glycol divinyl ether, trimethylolpropane trivinyl ether, cyclohexane-1,4-dimethylol divinyl ether, 1,4-butanediol divinyl ether, polyester divinyl ether, and polyurethane polyvinyl ether.

One kind of the cation polymerizable compound may be used, or two or more kinds thereof may be used together. As the photopolymerizable compound, an oligomer of the cation polymerizable compounds exemplified above may be used. In the case of making the refractive index of the metal oxide high and making the refractive index of the organic polymer low, in the present invention, a compound having no aromatic group to have low refractive index (for example, refractive index of 1.5 or less) is preferred out of the above-mentioned cation polymerizable compounds. In order to make the compatibility with the metal oxide better, preferred is a more hydrophilic glycol derivative such as polyethylene glycol diglycidyl ether.

It is advisable that in the present invention the photopolymerizable compound is used, for example, in an amount of about 5 to 1,000% by weight of total of the metal oxide, preferably in an amount of 10 to 300% by weight thereof. If the amount is less than 5% by weight, a large refractive index change is not easily obtained at the time of recording. If the amount is more than 1,000% by weight, a large refractive index change is not easily obtained, either, at the time of recording.

In the present invention, it is preferred that the hologram recording material further contains a photopolymerization initiator corresponding to the wavelength of recording light. When the photopolymerization initiator is contained in the hologram recording material, the polymerization of the photopolymerizable compound is promoted by the light exposure at the time of recording. Consequently, a higher sensitivity is achieved.

When a radical polymerizable compound is used as the photopolymerizable compound, a photo radical initiator is used. On the other hand, when a cation polymerizable compound is used as the photopolymerizable compound, a photo cation initiator is used.

Examples of the photo radical initiator include Darocure 1173, Irgacure 784, Irgacure 651, Irgacure 184 and Irgacure 907 (each manufactured by Ciba Specialty Chemicals Inc.). The content of the photo radical initiator is, for example, about 0.1 to 10% by weight, preferably about 0.5 to 5% by weight on the basis of the radical polymerizable compound.

As the photo cation initiator, for example, an onium salt such as a diazonium salt, a sulfonium salt, or a iodonium salt can be used. It is particularly preferred to use an aromatic onium salt. Besides, an iron-arene complex such as a ferrocene derivative, an arylsilanol-aluminum complex, or the like can be preferably used. It is advisable to select an appropriate initiator from these. Specific examples of the photo cation initiator include Cyracure UVI-6970, Cyracure UVI-6974 and Cyracure UVI-6990 (each manufactured by Dow Chemical Co. in USA), Irgacure 264 and Irgacure 250 (each manufactured by Ciba Specialty Chemicals Inc.), and CIT-1682 (manufactured by Nippon Soda Co., Ltd.). The content of the photo cation initiator is, for example, about 0.1 to 10% by weight, preferably about 0.5 to 5% by weight on the basis of the cation polymerizable compound.

The hologram recording material composition preferably contains a dye that functions as a photosensitizer corresponding to the wavelength of recording light or the like besides the photopolymerization initiator. Examples of the photosensitizer include thioxanthones such as thioxanthen-9-one, and 2,4-diethyl-9H-thioxanthen-9-one; xanthenes; cyanines; melocyanines; thiazines; acridines; anthraquinones; and squaliriums. It is advisable to set a amount to be used of the photosensitizer into the range of about 3 to about 50% by weight of the radical photoinitiator, for example, about 10% by weight thereof.

In such a way, the hologram recording material layer is produced wherein the photopolymerizable organic compound is uniformly contained in the metal oxide matrix.

The hologram recording medium of the present invention comprises at least the above-mentioned hologram recording material layer. Usually, a hologram recording medium comprises a supporting substrate (i.e., a substrate) and a hologram recording material layer; however, a hologram recording medium may be made only of a hologram recording material layer without having any supporting substrate. For example, a medium composed only of a hologram recording material layer may be obtained by forming the hologram recording material layer onto the substrate by application, and then peeling the hologram recording material layer off from the substrate. In this case, the hologram recording material layer is, for example, a layer having a thickness in the order of millimeters.

The hologram recording medium of the present invention is suitable for record and reproduction using not only a green laser light but also a blue laser light having a wavelength of 350 to 450 nm. When the reproduction is made using transmitted light, the medium preferably has a light transmittance of 50% or more at a wavelength of 405 nm. When the reproduction is made using reflected light, the medium preferably has a light reflectance of 25% or more at a wavelength of 405 nm.

The hologram recording medium is either of a medium having a structure for performing reproduction using transmitted light (hereinafter referred to as a transmitted light reproducing type medium), and a medium having a structure for performing reproduction using reflected light (hereinafter referred to as a reflected light reproducing type medium) in accordance with an optical system used for the medium.

The transmitted light reproducing type medium is constructed in such a manner that a laser light for readout is irradiated into the medium, the laser light irradiated therein is diffracted by signals recorded in its hologram recording material layer, and the laser light transmitted through the medium is converted to electric signals by means of an image sensor. In other words, in the transmitted light reproducing type medium, the laser light to be detected is transmitted through the medium toward the medium side opposite to the medium side into which the reproducing laser light is irradiated. The transmitted light reproducing type medium usually has a structure wherein its recording material layer is sandwiched between two supporting substrates. In an optical system used for the medium, the image sensor, for detecting the transmitted laser light, is set up in the medium side opposite to the medium side into which the reproducing laser light emitted from a light source is irradiated.

Accordingly, in the transmitted light reproducing type medium, the supporting substrate, the recording material layer, and any other optional layer(s) are each made of a light-transmitting material. It is unallowable that any element blocking the transmission of the reproducing laser light is substantially present. The supporting substrate is usually a rigid substrate made of glass or resin.

In the meantime, the reflected light reproducing type medium is constructed in such a manner that a laser light for readout is irradiated into the medium, the laser light irradiated therein is diffracted by signals recorded in its hologram recording material layer, and then, the laser light is reflected on its reflective film, and the reflected laser light is converted to electric signals by means of an image sensor. In other words, in the reflected light reproducing type medium, the laser light to be detected is reflected toward the same medium side as the medium side into which the reproducing laser light is irradiated. The reflected light reproducing type medium usually has a structure wherein the recording material layer is formed on a supporting substrate positioned at the medium side into which the reproducing laser light is irradiated; and a reflective film and an another supporting substrate are formed on the recording material layer. In an optical system used for the medium, the image sensor, for detecting the reflected laser light, is set up in the same medium side as the medium side into which the reproducing laser light emitted from a light source is irradiated.

Accordingly, in the reflected light reproducing type medium, the supporting substrate positioned at the medium surface side into which the reproducing laser light is irradiated, the recording material layer, and other optional layer(s) positioned nearer to the medium side into which the reproducing laser light is irradiated than the reflective film are each made of a light-transmitting material. It is unallowable that these members each substantially contain an element blocking the incident or reflective reproducing laser light. The supporting substrate is usually a rigid substrate made of glass or resin. The supporting substrate positioned at the medium surface side into which the reproducing laser light is irradiated is required to have a light-transmitting property.

In any case of the transmitted light reproducing type medium and the reflected light reproducing type medium, it is important that the hologram recording material layer has a high light transmittance of, for example, 50% or more at a wavelength of 405 nm. For example, in the case of considering a layer (100 μm in thickness) composed only of the matrix material (metal oxide material), it is preferred that the layer has a high light transmittance of 90% or more at a wavelength of 405 nm.

The hologram recording material layer obtained as above-mentioned has a high transmittance to a blue laser. Therefore, even if a thickness of the recording material layer is set to 100 μm, a recording medium having a light transmittance of 50% or more, preferably 55% or more at a wavelength of 405 nm is obtained when the medium is a transmitted light reproducing type medium; or a recording medium having a light reflectance of 25% or more, preferably 27.5% or more at a wavelength of 405 nm is obtained when the medium is a reflected light reproducing type medium. In order to attain holographic memory recording characteristics such that a high multiplicity is ensured, necessary is a recording material layer having a thickness of 100 μm or more, preferably 200 μm or more. According to the present invention, however, even if the thickness of the recording material layer is set to, for example, 1 mm, it is possible to ensure a light transmittance of 50% or more at a wavelength of 405 nm (when the medium is a transmitted light reproducing type medium), or a light reflectance of 25% or more at a wavelength of 405 nm (when the medium is a reflected light reproducing type medium).

When the above described hologram recording material layer is used, a hologram recording medium having a recording layer thickness of 100 μm or more, which is suitable for data storage, can be obtained. The hologram recording medium can be produced by forming the hologram recording material in a film form onto a substrate, or sandwiching the hologram recording material in a film form between substrates.

In a transmitted light reproducing type medium, it is preferred to use, for the substrate(s), a material transparent to a recording/reproducing wavelength, such as glass or resin. It is preferred to form an anti-reflection film against the recording/reproducing wavelength for preventing noises or give address signals and so on, onto the substrate surface at the side opposite to the layer of the hologram recording material. In order to prevent interface reflection, which results in noises, it is preferred that the refractive index of the hologram recording material and that of the substrate are substantially equal to each other. It is allowable to form, between the hologram recording material layer and the substrate, a refractive index adjusting layer comprising a resin material or oil material having a refractive index substantially equal to that of the recording material or the substrate. In order to keep the thickness of the hologram recording material layer between the substrates, a spacer suitable for the thickness between the substrates may be arranged. End faces of the recording material medium are preferably subjected to treatment for sealing the recording material.

About the reflected light reproducing type medium, it is preferred that the substrate positioned at the medium surface side into which a reproducing laser light is irradiated is made of a material transparent to a recording and reproducing wavelength, such as glass or resin. As the substrate positioned at the medium surface side opposite to the medium surface side into which a reproducing laser light is irradiated, a substrate having thereon a reflective film is used. Specifically, a reflective film made of, for example, Al, Ag, Au or an alloy made mainly of these metals and the like is formed on a surface of a rigid substrate (which is not required to have a light-transmitting property), such as glass or resin, by vapor deposition, sputtering, ion plating, or any other film-forming method, whereby a substrate having thereon the reflective film is obtained. A hologram recording material layer is provided so as to have a predetermined thickness on the surface of the reflective film of this substrate, and further a light-transmitting substrate is caused to adhere onto the surface of this recording material layer. An adhesive layer, a flattening layer and the like may be provided between the hologram recording material layer and the reflective film, and/or between the hologram recording material layer and the light-transmitting substrate. It is also unallowable that these optional layers hinder the transmission of the laser light.

Others than this matter are the same as in the above-mentioned transmitted light reproducing type medium.

EXAMPLES

The present invention will be more specifically described by way of the following examples; however, the present invention is not limited to these examples.

Example 1

Production of Ti-containing Metal Oxide Film

In 1 mL of a n-butanol solvent, 3.65 g of tetrabutoxytitanium (Ti(OBu)$_4$, manufactured by Kojundo Chemical Lab. Co., Ltd.) and 3.1 g of 2-ethyl-1,3-hexanediol (manufactured by Tokyo Chemical Industry Co., Ltd.) were mixed with each other at a room temperature, and the mixture was stirred for 10 minutes. The ratio by mole of Ti(OBu)$_4$/2-ethyl-1,3-hexanediol was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

The resultant sol solution was applied onto a glass substrate, and the resultant was dried at a room temperature for 1 hour. Next, the resultant was dried at 40° C. for 24 hours to volatilize the solvent. Through this drying step, the gelation (condensation reaction) of the metal oxide was advanced to yield a metal oxide film having a dry film thickness of 250 μm.

The resultant metal oxide film was colorless, and a light transmittance thereof to a blue laser light (wavelength: 405 nm) was 93%.

Comparative Example 1

In 1 mL of a n-butanol solvent, 3.65 g of tetrabutoxytitanium (Ti(OBu)$_4$, manufactured by Kojundo Chemical Lab. Co., Ltd.) and 2.76 g of ethyl acetoacetate (EtAcAc, manufactured by Tokyo Chemical Industry Co., Ltd.) were mixed with each other at a room temperature, and the mixture was stirred for 10 minutes. The ratio by mole of Ti(OBu)$_4$/EtAcAc was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

The resultant sol solution was applied onto a glass substrate, and the resultant was dried at a room temperature for 1 hour. Next, the resultant was dried at 40° C. for 24 hours to volatilize the solvent. Through this drying step, the gelation (condensation reaction) of the metal oxide was advanced to yield a metal oxide film having a dry film thickness of 200 μm.

The resultant metal oxide film was lightly yellowish, and a light transmittance thereof to a blue laser light (wavelength: 405 nm) was 4%.

Comparative Example 2

In 1 mL of a n-butanol solvent, 3.65 g of tetrabutoxytitanium (Ti(OBu) 4 manufactured by Kojundo Chemical Lab. Co., Ltd.) and 2.6 g of diphenyldimethoxysilane (manufactured by Shin-Etsu Chemical Co., Ltd.) were mixed with each other at a room temperature to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

The resultant sol solution was applied onto a glass substrate, and the resultant was dried at a room temperature for 1 hour. Next, the resultant was dried at 40° C. for 24 hours to volatilize the solvent. Through this drying step, the gelation (condensation reaction) of the metal oxide was advanced to yield a metal oxide film having a dry film thickness of 220 μm. In this drying step, countless cracks were generated in the metal oxide film. The resultant film was also lightly yellowish.

Example 2

Production of Hologram Recording Medium (Synthesis of Matrix Material)

In 1 mL of a n-butanol solvent, 3.65 g of tetrabutoxytitanium (Ti(OBu) 4 manufactured by Kojundo Chemical Lab. Co., Ltd.) and 3.1 g of 2-ethyl-1,3-hexanediol (manufactured by Tokyo Chemical Industry Co., Ltd.) were mixed with each other at a room temperature, and the mixture was stirred for 10 minutes. The ratio by mole of Ti(OBu)$_4$/2-ethyl-1,3-hexanediol was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

(Photopolymerizable Compound)

To 100 parts by weight of polyethylene glycol diacrylate (M-245, manufactured by Toagosei Co., Ltd.) as a photopolymerizable compound were added 3 parts by weight of a photopolymerization initiator (IRG-907, manufactured by Ciba Specialty Chemicals K.K.) and 0.3 part by weight of 2,4-diethyl-9H-thioxanthen-9-one as a photosensitizer to prepare a mixture containing the photopolymerizable compound.

(Hologram Recording Material)

The sol solution and the mixture containing the photopolymerizable compound were mixed with each other at a room temperature to set the ratio of the matrix material (as a non-volatile component) and that of the photopolymerizable compound to 67 parts by weight and 33 parts by weight, respectively. Furthermore, the sol-gel reaction was sufficiently advanced for 1 hour in a state that light was shielded from the system, so as to yield a hologram recording material solution.

The resultant hologram recording material solution was applied onto a glass substrate and then dried to prepare a recording medium sample, as will be detailed below.

With reference to FIG. 1, which schematically illustrates a cross section of a hologram recording medium, explanation will be described.

A glass substrate (22) having a thickness of 1 mm and having one surface on which an anti-reflection film (22a) was formed was prepared. A spacer (24) having a predetermined thickness was put on a surface of the glass substrate (22) on which the anti-reflection film (22a) was not formed, and the hologram recording material solution obtained was applied onto the surface of the glass substrate (22). The resultant was dried at a room temperature for 1 hour, and then dried at 40° C. for 24 hours to volatilize the solvent. Through this drying step, the gelation (condensation reaction) of the metal oxide was advanced so as to yield a hologram recording material layer (21) having a dry film thickness of 300 μm wherein the metal oxide and the photopolymerizable compound were uniformly dispersed.

(Hologram Recording Medium)

The hologram recording material layer (21) formed on the glass substrate (22) was covered with another glass substrate (23) having a thickness of 1 mm and having one surface on which an anti-reflection film (23a) was formed. At this time, the covering was carried out in such a manner that a surface of the glass substrate (23) on which the anti-reflection film (23a) was not formed would contact the surface of the hologram recording material layer (21). In this way, a hologram recording medium (11) was obtained which had a structure wherein the hologram recording material layer (21) was sandwiched between the two glass substrates (22) and (23).

(Evaluation of Characteristics)

Figure 2:
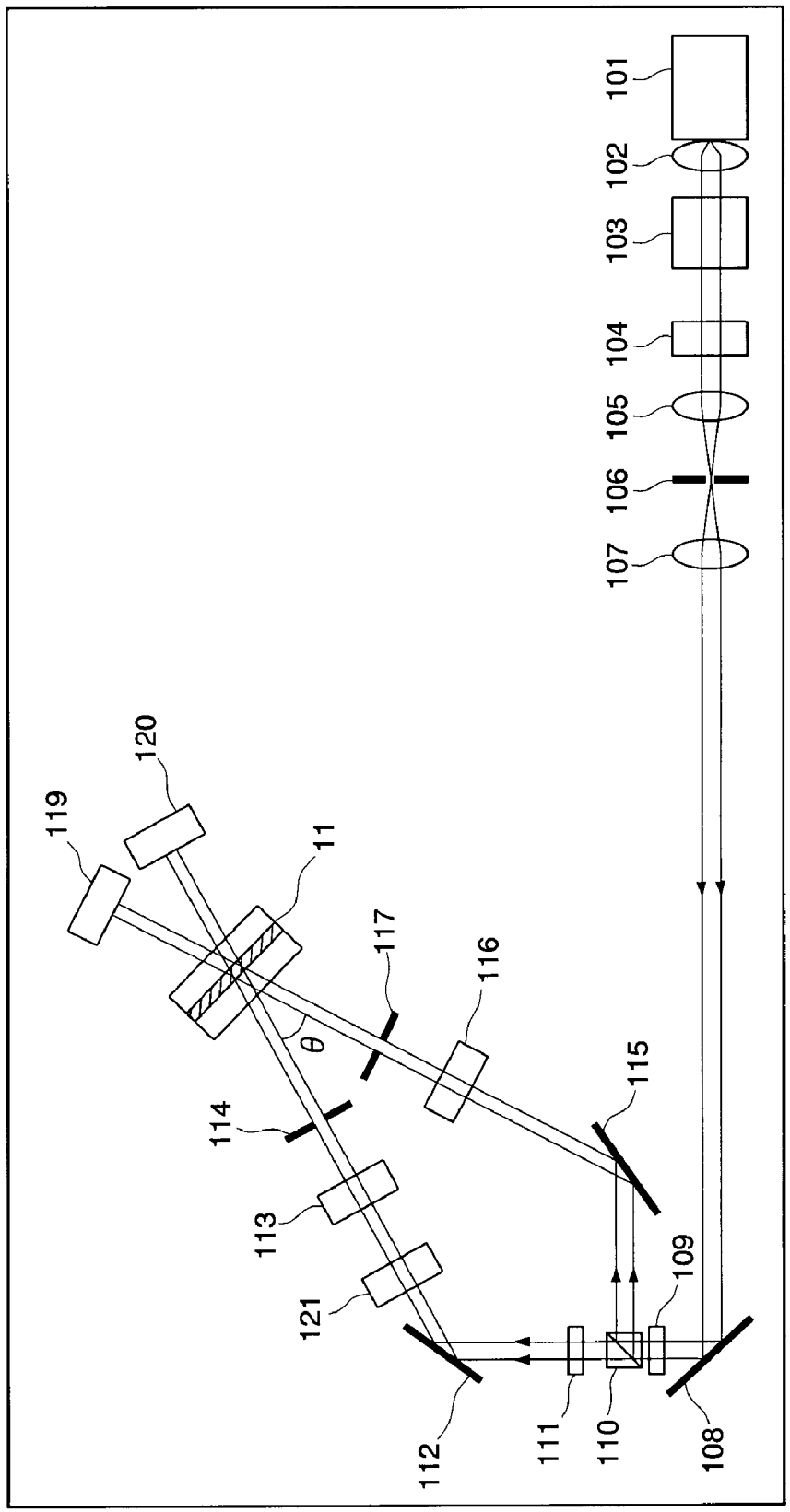
FIG. 2 is a plane view illustrating the outline of a hologram recording optical system used in the example.

About the resultant hologram recording material sample, characteristics thereof were evaluated in a hologram recording optical system as illustrated in FIG. 2. The direction along which the paper surface on which FIG. 2 is drawn stretches is defined as a horizontal direction for convenience' sake.

In FIG. 2, the hologram recording medium sample (11) was set to make the recording material layer perpendicular to the horizontal direction.

In the hologram recording optical system illustrated in FIG. 2, a light source (101) for emitting a semiconductor laser (wavelength: 405 nm) in a single mode oscillation was used. Light emitted from this light source (101) was subjected to a spatial filtrating treatment by means of a beam rectifier (102), a light isolator (103), a shutter (104), a convex lens (105), a pinhole (106), and a convex lens (107), so as to be collimated, thereby enlarging the light into a beam diameter of about 10 mmφ. The enlarged beam was passed through a mirror (108) and a ½ wavelength plate (109) to take out 45° (45 degree) polarized light. The light was split into an S wave and a P wave (the ratio of S wave/P wave is 1/1) through a polarized beam splitter (110). The S wave obtained by the splitting was passed through a mirror (115), a polarizing filter (116), and an iris diaphragm (117) while a ½ wavelength plate (111) was used to convert the P wave obtained by the splitting to an S wave and then the S wave was passed through a mirror (112), a polarizing filter (113) and an iris diaphragm (114). In this way, the total incident angle θ of the two light fluxes irradiated into the hologram recording medium sample (11) was set to 37°, so as to record interference fringes of the two light fluxes in the sample (11).

The sample (11) was rotated in the horizontal direction to attain multiplexing (angle multiplexing; sample angle: −21° to +21°, angular interval: 3°) and further the sample (11) was rotated around an axis perpendicular to the surface of the sample 11 to attain multiplexing (peristrophic multiplexing; sample angle: 0 to 90°, angular interval: 10°), thereby recording a hologram. The multiplicity was 150. At the time of the recording, the sample was exposed to the light while the iris diaphragms (114) and (117) were each set into 4φ.

Details of this multiple recording will be described hereinafter. The sample (11) was rotated in the horizontal direction (around the axis perpendicular to the paper surface) from −21° to +21° at angular intervals of 3° to attain multiplexing. Thereafter, the sample (11) was rotated at 10° (i.e., 10° when it was viewed from the side into which the laser light was irradiated) around the axis perpendicular to the surface of the sample (11). The sample (11) was again rotated in the horizontal direction from −21° to +21° at angular intervals of 3° to attain multiplexing. This was repeated 10 times to rotate the sample (11) around the axis perpendicular to the surface of the sample (11) from 0° to 90°, thereby attaining multiple recording giving a multiplicity of 150.

A position where the angle of the surface of the sample (11) to a central line (not illustrated) for dividing the angle θ made by the two light fluxes into two equal parts was 90° was defined as a position where the angle in the horizontal rotation was ±0°. The axis perpendicular to the surface of the sample (11) is as follows: when the sample (11) is rectangular, the axis is a perpendicular axis passing at an intersection point of the two diagonal lines; and when the sample (11) is circular, the axis is a perpendicular axis passing at the center of the circle.

In order to react remaining unreacted components after the hologram recording, a sufficient quantity of light was irradiated by use of only one light fluxes. At the time of reproduction, with shading by the shutter (121), the iris diaphragm (117) was set into 3φ and only one light flux was irradiated. The sample (11) was continuously rotated into the horizontal direction from −23° to +23° and further rotated around the axis perpendicular to the surface of the sample (11) from 0° to 90° at angular intervals of 10°. In the individual angle positions, the diffraction efficiency was measured with a power meter (120). When a change in the volume (a recording shrinkage) or a change in the average refractive index of the recording material layer is not generated before and after the recording, the diffraction peak angle in the horizontal direction at the time of the recording is consistent with that at the time of the reproduction. Actually, however, a recording shrinkage or a change in the average refractive index is generated; therefore, the diffraction peak angle in the horizontal direction at the time of the reproduction is slightly different from the diffraction peak angle in the horizontal direction at the time of the recording. For this reason, at the time of the reproduction, the angle in the horizontal direction was continuously changed and then the diffraction efficiency was calculated from the peak intensity when a diffraction peak made its appearance. In FIG. 2, reference number (119) represents a power meter not used in this example.

At this time, a dynamic range M/# (the sum of the square roots of the diffraction efficiencies) was a high value of 17.9, which was a converted value corresponding to the case that the thickness of the hologram recording material layer was converted to 1 mm. A light transmittance of the medium (recording layer thickness: 300 μm) before the recording exposure to light (i.e., at the initial stage) was 81% at 405 nm. A fall in the light transmittance of the medium at 405 nm (i.e., the recording wavelength) after the recording was not observed.

At this time, a reduction ratio in the light transmittance on the basis of the glass substrates (22) and (23) each having the anti-reflection film was 0.6%. Specifically, with reference to FIG. 1, a laser light was irradiated into the sample (11) from the side of the substrate (22), so as to be transmitted toward the side of the substrate (23); in this case, 0.3% of the light was reflected on the interface between the air and the anti-reflection film (22a) by the presence of the anti-reflection film (22a), and 99.7% thereof was transmitted (absorption: 0%), and 0.3% of the transmitted light (that is, 99.7%) was reflected on the interface between the anti-reflection film (23a) of the substrate (23) and the air. As a result, 99.4% of the original laser light was transmitted.

The refractive index of the glass substrates (22) and (23) was substantially equal to that of the hologram recording material layer (21); therefore, reflection on the interface between the glass substrate (22) and the recording material layer (21) and reflection on the interface between the recording material layer (21) and the glass substrate (23) may be neglected.

Furthermore, without adding the photopolymerizable compound, the photopolymerization initiator nor the photosensitizer to the matrix material in the above-mentioned operation, a layer (dry thickness: 300 μm) made only of the matrix material was separately formed on a surface of the same antireflection-film-provided glass substrate (22) as used in the production of the sample (11), the antireflective film (22a) being not formed on said surface. A light transmittance of this matrix material layer was 93% at 405 nm. The light transmittance of the matrix material layer was measured by irradiating a laser light having a wavelength of 405 nm into the formed sample from the side of the glass substrate (22) so as to be transmitted through the matrix material layer.

Example 3

Production of Hologram Recording Medium (Synthesis of Matrix Material)

At a room temperature, 6.76 g of titanium dioctyloxybis (octyleneglycolato) (product name: TC-200, manufactured by Matsumoto Fine Chemical Co., Ltd.) and 2.6 g of diphenyldimethoxysilane (manufactured by Shin-Etsu Chemical Co., Ltd.) were mixed with each other to prepare a metal alkoxide solution. The ratio by mole of Ti/Si was 0.7/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

In the same manner as in Example 2, the resultant sol solution and the mixture containing the photopolymerizable compound were mixed with each other at a room temperature. In the state that the system was shielded from light, the sol-gel reaction was sufficiently advanced for 1 hour to yield a hologram recording material solution. The resultant hologram recording material solution was applied onto the substrate in the same manner as in Example 2 to yield a hologram recording material layer (21) having a dry film thickness of 280 µm. In this way, a hologram recording medium (11) was obtained.

Characteristics thereof were evaluated in the same manner as in Example 2. As a result, a dynamic range M/# was a high value of 18.1, which was a converted value corresponding to the case that the thickness of the hologram recording material layer was converted to 1 mm.

A light transmittance of the medium (recording layer thickness: 280 µm) before the recording exposure to light (i.e., at the initial stage) was 80% at 405 nm. A fall in the light transmittance of the medium at 405 nm (i.e., the recording wavelength) after the recording was not observed.

Furthermore, a layer (dry thickness: 280 µm) made only of the matrix material and formed separately in the same manner as in Example 2 had a light transmittance of 96% at 405 nm.

Example 4

Production of Hologram Recording Medium (Synthesis of Matrix Material)

In 1 mL of a n-butanol solvent, 3.65 g of tetrabutoxytitanium (Ti(OBu)$_4$, manufactured by Kojundo Chemical Lab. Co., Ltd.) and 2.52 g of 2-methylpentane-2,4-diol (manufactured by Tokyo Chemical Industry Co., Ltd.) were mixed with each other at a room temperature, and the mixture was stirred for 10 minutes. The ratio by mole of Ti(OBu)$_4$/2-methylpentane-2,4-diol was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

In the same manner as in Example 2, the resultant sol solution and the mixture containing the photopolymerizable compound were mixed with each other at a room temperature. In the state that the system was shielded from light, the sol-gel reaction was sufficiently advanced for 1 hour to yield a hologram recording material solution. The resultant hologram recording material solution was applied onto the substrate in the same manner as in Example 2 to yield a hologram recording material layer (21) having a dry film thickness of 300 µm. In this way, a hologram recording medium (11) was obtained.

Characteristics thereof were evaluated in the same manner as in Example 2. As a result, a dynamic range M/# was a high value of 14.0, which was a converted value corresponding to the case that the thickness of the hologram recording material layer was converted to 1 mm.

A light transmittance of the medium (recording layer thickness: 300 µm) before the recording exposure to light (i.e., at the initial stage) was 83% at 405 nm. A fall in the light transmittance of the medium at 405 nm (i.e., the recording wavelength) after the recording was not observed.

Furthermore, a layer (dry thickness: 300 µm) made only of the matrix material and formed separately in the same manner as in Example 2 had a light transmittance of 94% at 405 nm.

Example 5

Production of Hologram Recording Medium (Synthesis of Matrix Material)

In 1 mL of a n-butanol solvent, 3.65 g of tetrabutoxytitanium (Ti(OBu)$_4$, manufactured by Kojundo Chemical Lab. Co., Ltd.) and 2.86 g of dipropylene glycol (manufactured by Tokyo Chemical Industry Co., Ltd.) were mixed with each other at a room temperature, and the mixture was stirred for 10 minutes. The ratio by mole of Ti(OBu)$_4$/dipropylene glycol was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

In the same manner as in Example 2, the resultant sol solution and the mixture containing the photopolymerizable compound were mixed with each other at a room temperature. In the state that the system was shielded from light, the sol-gel reaction was sufficiently advanced for 1 hour to yield a hologram recording material solution. The resultant hologram recording material solution was applied onto the substrate in the same manner as in Example 2 to yield a hologram recording material layer (21) having a dry film thickness of 260 µm. In this way, a hologram recording medium (11) was obtained.

Characteristics thereof were evaluated in the same manner as in Example 2. As a result, a dynamic range M/# was a high value of 9.7, which was a converted value corresponding to the case that the thickness of the hologram recording material layer was converted to 1 mm.

A light transmittance of the medium (recording layer thickness: 260 µm) before the recording exposure to light (i.e., at the initial stage) was 77% at 405 nm. A fall in the light transmittance of the medium at 405 nm (i.e., the recording wavelength) after the recording was not observed.

Example 6

Production of Hologram Recording Medium

In this example, a titanium butoxide decamer represented by the following structural formula was used as a Ti alkoxide compound:

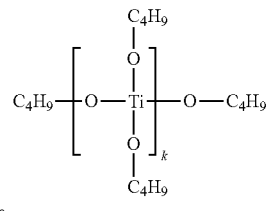

k = 10

(Synthesis of Matrix Material)

In 2 mL of a n-butanol solvent, 4.8 g of the titanium butoxide decamer (B-10, manufactured by Nippon Soda Co., Ltd.) and 4.0 g of 2,4-pentanediol (manufactured by Tokyo Chemical Industry Co., Ltd.) were mixed with each other at a room temperature, and the mixture was stirred for 10 minutes. The ratio by mole of Ti/2,4-pentanediol was 1/1.9. To this reaction mixture was added 5.2 g of diphenyldimethoxysilane (manufactured by Shin-Etsu Chemical Co., Ltd.) to prepare a metal alkoxide solution. The ratio by mole of Ti/Si was 1/1.

A solution composed of 0.4 mL of water, 0.16 mL of a 2 N aqueous solution of hydrochloric acid, and 2 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

In the same manner as in Example 2, the resultant sol solution and the mixture containing the photopolymerizable compound were mixed with each other at a room temperature. In the state that the system was shielded from light, the sol-gel reaction was sufficiently advanced for 1 hour to yield a hologram recording material solution. The resultant hologram recording material solution was applied onto the substrate in the same manner as in Example 2 to yield a hologram recording material layer (21) having a dry film thickness of 430 μm. In this way, a hologram recording medium (11) was obtained.

Characteristics thereof were evaluated in the same manner as in Example 2. As a result, a dynamic range M/# was a high value of 12.0, which was a converted value corresponding to the case that the thickness of the hologram recording material layer was converted to 1 mm.

A light transmittance of the medium (recording layer thickness: 430 μm) before the recording exposure to light (i.e., at the initial stage) was 60% at 405 nm. A fall in the light transmittance of the medium at 405 nm (i.e., the recording wavelength) after the recording was not observed.

Furthermore, a layer (dry thickness: 300 μm) made only of the matrix material and formed separately in the same manner as in Example 2 had a light transmittance of 82% at 405 nm.

Comparative Example 3

Synthesis of Matrix Material

In 6 mL of a tetrahydrofuran solvent, 7.2 g of the titanium butoxide decamer (B-10, manufactured by Nippon Soda Co., Ltd.) and 7.8 g of diphenyldimethoxysilane (manufactured by Shin-Etsu Chemical Co., Ltd.) were mixed with each other to prepare an alkoxide solution. The ratio by mole of Ti/Si was 1/1.

A solution composed of 0.9 mL of water, 0.36 mL of a 2 N aqueous solution of hydrochloric acid, and 3 mL of tetrahydrofuran was dropwise added to the alkoxide solution at a room temperature while the alkoxide solution was stirred. The stirring was continued for 30 minutes to conduct hydrolysis reaction and condensation reaction. In this way, a sol solution was yielded.

(Photopolymerizable Compound)

To 100 parts by weight of polyethylene glycol diacrylate (M-245, manufactured by Toagosei Co., Ltd.) as a photopolymerizable compound were added 3 parts by weight of a photopolymerization initiator (IRG-907, manufactured by Ciba Specialty Chemicals K.K.) and 0.3 part by weight of thioxanthen-9-one as a photosensitizer to prepare a mixture containing the photopolymerizable compound.

(Hologram Recording Material Solution)

The sol solution and the mixture containing the photopolymerizable compound were mixed with each other at a room temperature to set a ratio of the matrix material (as a nonvolatile component) and that of the photopolymerizable compound to 67 parts by weight and 33 parts by weight, respectively. Furthermore, the sol-gel reaction was sufficiently advanced for 1 hour in a state that light was shielded from the system, so as to yield a hologram recording material solution.

The resultant hologram recording material solution was applied in the same manner as in Example 2 to yield a hologram recording material layer (21) having a dry thickness of 390 μm. A hologram recording medium (11) was obtained in this manner.

Characteristics thereof were evaluated in the same manner as in Example 2. As a result, a dynamic range M/# was a high value of 11.4, which was a converted value corresponding to the case that the thickness of the hologram recording material layer was converted to 1 mm. However, a light transmittance of the medium (recording layer thickness: 390 μm) before the recording exposure to light (i.e., at the initial stage) was 31% at 405 nm. After the recording, the light transmittance of the medium at 405 nm (i.e., the recording wavelength) was a lowered value of 1%.

Furthermore, a layer (dry thickness: 390 μm) made only of the matrix material and formed separately in the same manner as in Example 2 had a light transmittance of 50% at 405 nm.

Comparative Example 4

Synthesis of Matrix Material

In 1 mL of a n-butanol solvent, 3.65 g of tetrabutoxytitanium (Ti(OBu)$_4$, manufactured by Kojundo Chemical Lab. Co., Ltd.) and 2.76 g of ethyl acetoacetate (EtAcAc, manufactured by Tokyo Chemical Industry Co., Ltd.) were mixed with each other at a room temperature, and the mixture was stirred for 10 minutes. The ratio by mole of Ti(OBu)$_4$/EtAcAc was 1/2. To this reaction mixture was added 2.6 g of diphenyldimethoxysilane (manufactured by Shin-Etsu Chemical Co., Ltd.) to prepare a metal alkoxide solution. The ratio by mole of Ti/Si was 1/1.

A solution composed of 0.2 mL of water, 0.08 mL of a 2 N aqueous solution of hydrochloric acid, and 1 mL of an ethanol solvent was dropwise added to the above-mentioned metal alkoxide solution at a room temperature while the alkoxide solution was stirred. The stirring was continued for 30 minutes to conduct hydrolysis reaction and condensation reaction. In this way, a sol solution was yielded.

(Photopolymerizable Compound)

To 100 parts by weight of polyethylene glycol diacrylate (M-245, manufactured by Toagosei Co., Ltd.) as a photopolymerizable compound were added 3 parts by weight of a photopolymerization initiator (IRG-907, manufactured by Ciba Specialty Chemicals K.K.) and 0.3 part by weight of 2,4-diethyl-9H-thioxanthen-9-one as a photosensitizer to prepare a mixture containing the photopolymerizable compound.

(Hologram Recording Material)

The sol solution and the mixture containing the photopolymerizable compound were mixed with each other at a room temperature to set the ratio of the matrix material (as a nonvolatile component) and that of the photopolymerizable compound to 67 parts by weight and 33 parts by weight, respectively. Furthermore, the sol-gel reaction was sufficiently advanced for 1 hour in a state that light was shielded from the system, so as to yield a hologram recording material solution.

The resultant hologram recording material solution was applied onto the substrate in the same manner as in Example 2 to yield a hologram recording material layer (21) having a dry film thickness of 310 μm. In this manner, a hologram recording medium (11) was obtained.

However, a light transmittance of the medium (recording layer thickness: 310 μm) before the recording exposure to light (i.e., at the initial stage) was 15% at a wavelength of 405 nm. The medium was not permitted to be used as a recording medium.

As described in Comparative Example 1, the light transmittance of a layer (dry thickness: 200 μm) made only of the same matrix material was 4% at a wavelength of 405 nm.

What is claimed is:

1. A process for producing a metal oxide comprising at least Ti as a metal element, the process comprising:
   providing an alkoxide compound of Ti to which a glycol other than any geminal diol and any vicinal diol is coordinated;
   hydrolyzing the alkoxide compound of Ti to which the glycol is coordinated, thereby yielding a precursor of a metal oxide; and
   advancing polycondensation reaction of the metal oxide precursor, thereby forming the metal oxide;
   wherein
   the glycol coordinated to the Ti is a polyalkylene oxide of formula (II):

$$HO-(R_{11}O)p-H \quad (II)$$

wherein
   $R_{11}$ is a linear alkylene group having 3 to 6 carbons, p is the number of alkylene repeating units and $2 \leq p \leq 6$.

2. The process for producing a metal oxide according to claim 1, further comprising:
   mixing the alkoxide compound of Ti with the glycol, thereby coordinating the glycol to the alkoxide compound of Ti.

3. A process for producing a metal oxide comprising at least Ti and Si as metal elements, the process comprising:
   providing an alkoxide compound of Ti to which a glycol other than any geminal diol and any vicinal diol is coordinated;
   mixing the alkoxide compound of Ti to which the glycol is coordinated with an alkoxide compound of Si;
   hydrolyzing the mixed alkoxide compounds, thereby yielding a precursor of a metal oxide; and
   advancing polycondensation reaction of the metal oxide precursor, thereby forming the metal oxide;
   wherein
   the glycol coordinated to the Ti is a polyalkylene oxide of formula (II):

$$HO-(R_{11}O)p-H \quad (II)$$

wherein
   $R_{11}$ is a linear alkylene group having 3 to 6 carbons, p is the number of alkylene repeating units and $2 \leq p \leq 6$.

4. The process for producing a metal oxide according to claim 3, further comprising:
   mixing the alkoxide compound of Ti with the glycol, thereby coordinating the glycol to the alkoxide compound of Ti.

5. A hologram recording material comprising a metal oxide matrix and a photopolymerizable compound,
   wherein the metal oxide matrix comprises at least Ti and Si as metal elements, and a glycol is coordinated to Ti;
   wherein
   the glycol coordinated to the Ti is a polyalkylene oxide of formula (II):

$$HO-(R_{11}O)p-H \quad (II)$$

wherein
   $R_{11}$ is a linear alkylene group having 3 to 6 carbons, p is the number of alkylene repeating units and $2 \leq p \leq 6$.

6. A hologram recording medium having a hologram recording layer comprising the hologram recording material according to claim 5.

7. The hologram recording medium according to claim 6, wherein record/reproduction of said hologram recording medium are performed by use of a laser light having a wavelength of 350 to 450 nm.

8. A process for producing a hologram recording material comprising a metal oxide comprising at least Ti and Si as metal elements, and a photopolymerizable compound, the process comprising:
   providing an alkoxide compound of Ti to which a glycol other than any geminal diol and any vicinal diol is coordinated;
   mixing the alkoxide compound of Ti to which the glycol is coordinated with an alkoxide compound of Si;
   hydrolyzing the mixed alkoxide compounds, thereby yielding a precursor of a metal oxide;
   incorporating a photopolymerizable compound into the resultant system before, during, or after the hydrolysis; and
   advancing polycondensation reaction of the metal oxide precursor into which the photopolymerizable compound is incorporated;
   wherein
   the glycol coordinated to the Ti is a polyalkylene oxide of formula (II):

$$HO-(R_{11}O)p-H \quad (II)$$

wherein
   $R_{11}$ is a linear alkylene group having 3 to 6 carbons, p is the number of alkylene repeating units and $2 \leq p \leq 6$.

9. The process for producing a hologram recording material according to claim 8, further comprising:
   mixing the alkoxide compound of Ti with the glycol, thereby coordinating the glycol to the alkoxide compound of Ti.

10. A hologram recording medium having a hologram recording layer comprising the hologram recording material obtained by the producing process according to claim 8.

11. The hologram recording medium according to claim 10, wherein record/reproduction of said hologram recording medium are performed by use of a laser light having a wavelength of 350 to 450 nm.

* * * * *